United States Patent [19]

Boyer

[11] 3,795,791

[45] Mar. 5, 1974

[54] AUTOMATIC CODE-CORRECTING DEVICE

[75] Inventor: Marcel-Louis Boyer, Chatillon, France

[73] Assignee: Compagnie Industrielle des Telecommunications CIT-ALCATEL, Paris, France

[22] Filed: Dec. 14, 1971

[21] Appl. No.: 207,907

[30] Foreign Application Priority Data

Dec. 14, 1970 France .............................. 70.45009

[52] U.S. Cl..................... 235/61.1, 234/34, 234/129

[51] Int. Cl. ............................................. G06k 1/02

[58] Field of Search....... 235/61.1, 61.11 E; 234/33, 234/34, 129

[56] References Cited

UNITED STATES PATENTS

| | | | |
|---|---|---|---|
| 3,448,247 | 6/1969 | Jones | 235/61.1 |
| 3,016,186 | 1/1962 | Haupt | 234/33 X |
| 3,144,205 | 8/1964 | Turner | 234/34 |
| 3,474,956 | 10/1969 | Cain | 234/34 |

*Primary Examiner*—Thomas J. Sloyan
*Attorney, Agent, or Firm*—Craig and Antonelli

[57] ABSTRACT

Device for automatically correcting a code, forming an improvement to a device which combines, in a single unit, means for perforating a paper tape which moves step-by-step, and for reading the code which has just been perforated during the preceding step, this improvement consisting of automatically correcting any code which has been erroneously perforated by causing the tape to step back to the location of the error and either correcting the error or voiding and re-perforating the code at a new location.

6 Claims, 5 Drawing Figures

AUTOMATIC CODE-CORRECTING DEVICE

The present invention relates in general to the field of data transmission, and more particularly to an improvement of an apparatus which combines in a single unit the means for selectively perforating a paper tape which is advanced step-by-step and for reading the code that has been perforated during the preceding step. This improvement consists of automatically correcting a code which might have been perforated incorrectly, so as to improve the transmission reliability of the data at the cost of a loss in time that is as small as possible.

Punching perforations into a paper tape and reading a perforated tape are two complementary operations. In the first, the tape is advanced step-by-step and at each momentary arrest of the tape a coded pattern of holes is punched across the width of the tape. Each hole occupies a predetermined position relative to the tape edges. The information represented by the coded pattern of holes may be provided by a calculator, an analogue-to-digital converter, or any of a wide range of devices.

The reading operation consists of generating coded electrical signals from the coded hole patterns on the tape. Generally, these two operations are carried out by distinct apparatus units. A tape passes from a perforator to a reader in which a reading operation succeeds the punching operation. There are cases in which reading a punched code must be carried out in the immediate vicinity of the tape punch, however. This occurs, for example, in digitally controlled machine tools, where lack of space presupposes grouping of the program units close to one another. Also, there is an evident advantage in carrying out reading shortly after punching, for the purpose of detecting errors which may arise in the punching operation.

It is already known to provide a perforator-reader as described in my copending application Ser. No. 167,601, filed July 30, 1971, which upon actuation of an inverter, can operate either as a perforator with concomitant reading, or as a reader only. In a first state of the inverter, at each advancing step of the tape, a group of punches perforates a code into the paper tape according to the logical signals furnished for example by a communication unit which is operatively connected to a computing device. At the same time, reading elements, for example photoelectric reading means, emit logic signals corresponding to the code which has been perforated during the preceding step. In the second state of the inverter, the perforating elements are rendered inactive; and, the tape which has been perforated in its entirety in a preceding operation is read by the reading means. The apparatus is conceived preferably for operation at high speed, for example in the order of 120 characters or symbols per second.

It may occur that a perforation order or command is incorrectly executed. The error may result from the fact that either one or several holes are missing or from the fact that there are either one or several holes too many at any given position for a particular logic signal. Such errors may be due to mechanical defects, parasitic pulses, etc.

It is the object of the present invention to attach to a perforator-reader an arrangement including mechanical and electrical elements which assure the automatic correction of a code which has been perforated incorrectly. Furthermore, it is not limited to being used with a perforator-reader, but may be applied to any recording means (for example a magnetic recorder) that is operatively connected to a reader.

For this purpose the present invention makes use of logic signals formed by the combination of the perforation order signals, emanating from the communication unit, with the reading signals derived from the reader. In a communication unit of the type employed in the present case, it is customary to keep the perforation orders of one character in a buffer memory until the next following character is requested. When the reader reads a character, the perforation orders of the same character are still in the buffer memory of the communication unit and the comparison of the two signals is therefore possible. If this comparison, which is made automatically with logic means, detects a perforation error, be it one of deficiency or one of excess, the advancing motor of the tape receives a recoil order or command, which first allows recoil of the tape followed by a correction of the error and secondly a resumption of the sequence of the perforations.

If a hole or aperture should be missing, the affected punch receives a perforation order to supply the missing hole or aperture when the advance is resumed. If there is a hole or aperture too many, an order is released to perforate all of the spaces with holes and then to resume the transcription of the message by advancing the tape and reperforating the faulty character.

The present invention will now be described hereinafter in further detail with reference to and taken in connection with the accompanying drawings, wherein FIG. 1 is a general schematic diagram of the system of the present invention including certain elements of a tape perforator-reader connected thereto;

Figure 1:
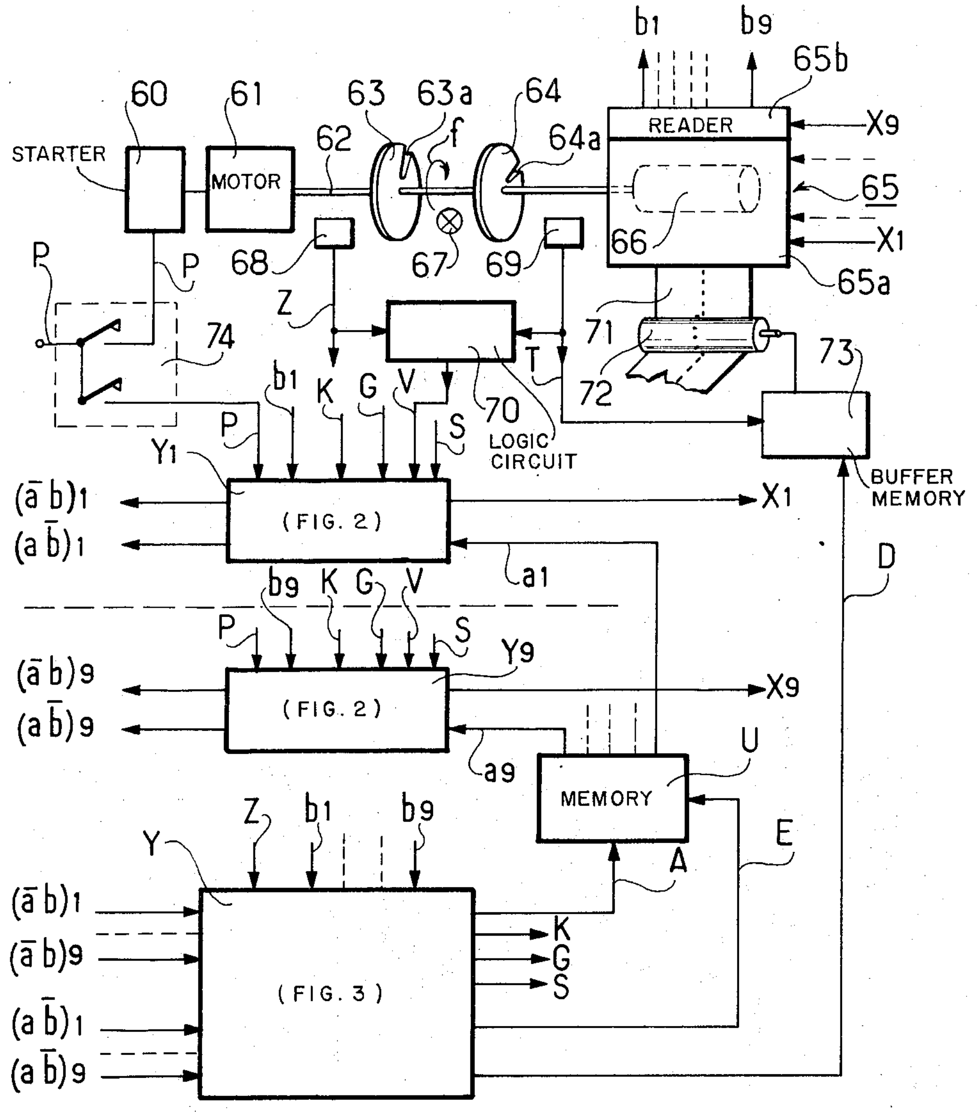

The perforator-reader is schematically shown at 65 in FIG. 1. It comprises in a single mechanical unit a perforator **65*a* and a reader 65*b*. The perforator has as many punches or printing means as there are bits in a code to be perforated (characters), plus one punch for perforating an advance hole or aperture. Let it be assumed by way of example that one character contains eight bits, or nine punches for the perforator. These punches (not shown) pierce the corresponding code in a paper tape 71 due to the command of logic signals X1 . . . X9 each of which may act upon an electromagnet (not shown) having the effect of establishing a selective connection between one of the punches and a cam 66 turning around an eccentric axle or shaft 62**.

A starter 60, such as a standard relay, is connected to a motor 61 having a shaft 62 which carries an opaque disk 63 equipped with a slit **63*a*, an opaque disk 64 equipped with a slit 64*a*, and a cam 66 for controlling the perforating punches (for example nine punches) contained in the member 65. The shaft 62** turns in the direction of the arrow *f*. The portion **65*a*** of the element 65 contains nine lamps aligned or arranged opposite the nine punches; the portion 65*b* contains nine photoelectric cells emitting a signal (*b*1 to *b*9) when one of the corresponding holes has been perforated in a tape 71 as it is unwound in response to the control of a motor 72 driving the tape and being controlled in turn by a buffer memory 73. The advancing pace of the band 71 is fixed, for example, at the value $p = 2.54$ mm. A lamp 67 is placed between the disks 63 and 64 so as to selectively illuminate two photoelectric cells 68 and 69, one of which emits a synchronizing signal Z at the passage of the slit 63*a* before the lamp 67, while the other one emits a tape advancing signal T at the passage of the slit 64*a* before the lamp 67. The slits 63*a* and 64*a* are shifted with respect to each other by an angle $\alpha$. The one which is ahead in the direction of rotation $f$ (64*a*) furnishes, at the output of the corresponding cell 69, a signal T for the advance control of the tape which is applied to the control member 73 of the motor 72, so that the tape is advanced in a step-by-step manner. The signals T and Z are applied to a logic member 70 which emits a speed control signal V if the speed of rotation of the shaft 62 and of the cam 66 is greater than a predetermined lower limit i.e., if the time between the signal V and the signal T is less than a predetermined time.

An switch 74 shown in mechanical form, which may, however, also be provided in electronic form for rapid operation, assures the transition of the apparatus from the operation as a perforator-reader to the operation as a reader only. In the first case, a signal P is applied to the control member 60 as well as to other members which will be further described hereinbelow. In the second case, the signal P is not transmitted.

Figure 2:
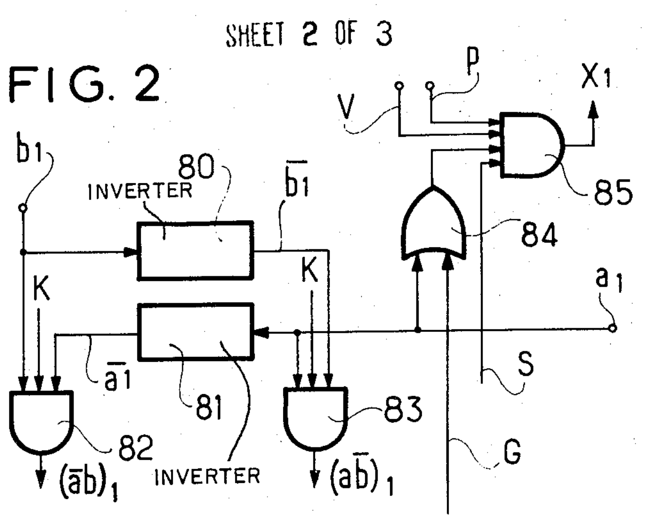
FIG. 2 is a schematic circuit diagram of the details of the individual subgroups in the system of FIG. 1.
Figure 3:
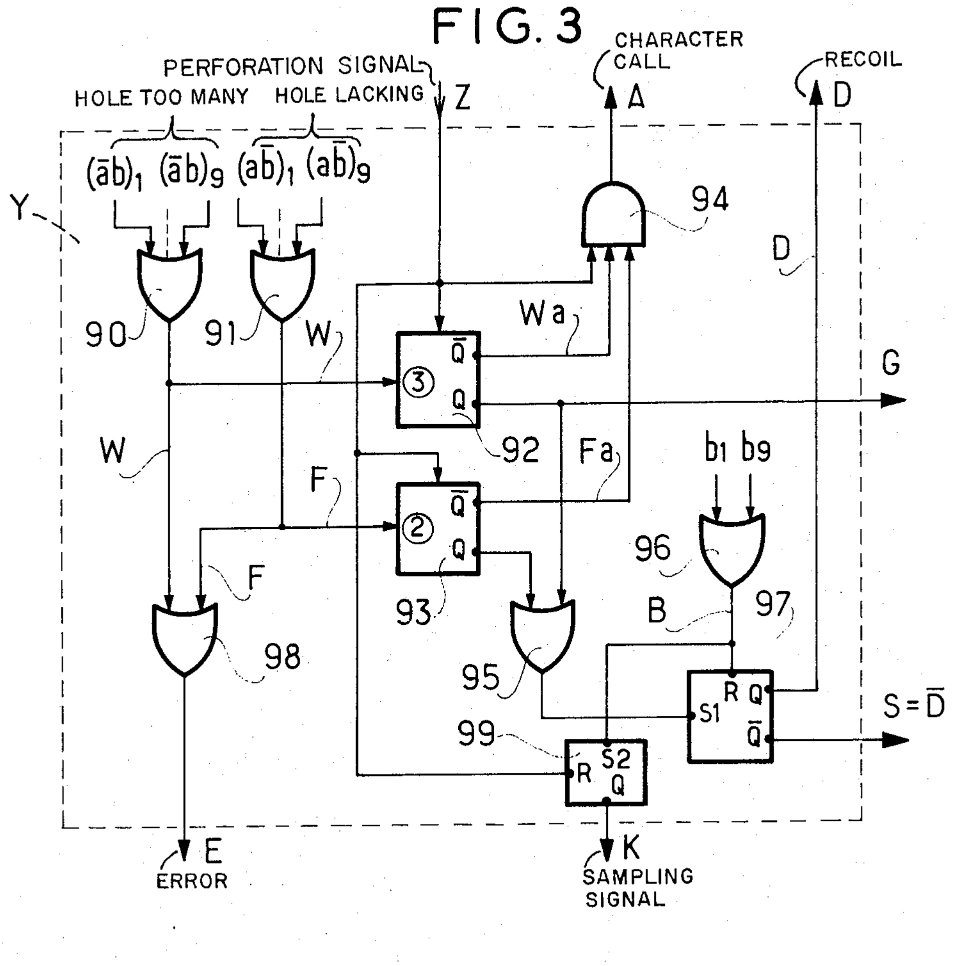
FIG. 3 is a schematic circuit diagram of the common subgroup in the system of FIG. 1.

The signals indicated in FIG. 1 have the following meaning: P is the order or command for starting of the motor 61; K is a sampling signal (FIG. 3); G is the command or order for the perforation of all the holes at once (FIG. 3); V is the speed control signal derived from logic member 70; S is equal to $\bar{D}$, with D = the recoil order (FIG. 3) and is the authorization for marking; A is the character call (FIG. 3); *a*1 . . . *a*9 are logical signals constituting the code to be perforated; *b*1 . . . *b*9 are logical signals constituting the perforation; X1 . . . X9 are orders for perforating holes No. 1 . . . 9 (FIG. 2); T is the signal for the advance control of the tape; and Z is the signal for authorizing the perforation.

The logic members which assure the control and, if necessary, the correction of the perforated codes are accommodated in nine individual subgroups Y1 to Y9 and one common subgroup Y. The logic signals constituting the code to be perforated, $a_1 \ldots a_9$, are furnished by a communication unit U, which may be manually operated through a keyboard or operate in response to a computer or communication receiver, etc., connected thereto.

The subgroup Y1 receives from the communication unit U a signal $a_1$ and from the reader 65*b* a signal $b_1$. It also receives the signals P, V and a signal G, a signal K and a coding authorization signal S originating from the common subgroup Y (see FIG. 3). It furnishes to the member 65*a* the signal X1 and to the subgroup Y the signals $(\bar{a}b)_1$ and $(a\bar{b})_1$.

The signal $(\bar{a}b)_1 = \bar{a}_1 \cdot b_1$ is produced when a hole or aperture is perforated in the absence of the corresponding logical signal. This is the signal designating "hole too many." The signal $(a\bar{b})_1 = a_1 \cdot \bar{b}_1$ is produced when a logical perforation signal $a_1$ does not furnish a hole when a logic signal is provided therefor. This is the signal designating "hole lacking."

There exist nine similar subgroups or sub-assemblies, but only the last of these Y9 has been additionally illustrated. It receives the signals *a*9, *b*9, P, G, V, and furnishes to the member 65*a* the signal X9 and to the subgroup Y the signals $(\bar{a}b)_9$ and $(a\bar{b})_9$.

The subgroup Y receives the signals $b_1 \ldots b_9$, the signals $(\bar{a}b)_1 \ldots (\bar{a}b)_9$, the signals $(a\bar{b})_1 \ldots (a\bar{b})_9$, the signal Z, and furnishes to the communication unit U a character call signal A and an error signal E, and to the buffer memory 73 a recoil order signal D having the effect of causing the tape 71 to recoil by one step in case a correction is necessary.

A subgroup such as Y1 is illustrated in FIG. 2 and comprises a logic inverter 80 which receives the signal $b_1$ and furnishes the signal $\bar{b}_1$; a logical inverter 81 which receives the signal $a_1$ and furnishes the signal $\bar{a}_1$; an AND gate 82 which receives the signals $\bar{a}_1$ and $b_1$ and a sampling signal K originating from the member Y and furnishes the signal $(\bar{a}b)_1$; an AND gate 83 which receives the signals $a_1$ and $\bar{b}_1$ and the aforementioned sampling signal K and furnishes the signal $(a\bar{b})_1$; an OR gate 84 which receives the signal $a_1$ and also a signal G produced in the member Y (see FIG. 3). The AND gate 85 receives the output signal of the OR gate 84 as well as the signal V, the signal P and the signal S, and furnishes at the output the signal X1, which is the perforation order applied to the punch or imprinting means No. 1 in the perforator-reader device 65.

The signal G controls the perforation of all the holes in case there is the need for it. The signal K is a sampling signal derived from the common subgroup Y at a point during the time period of the step. The signal $S = \bar{D}$ permits perforation only in the absence of a recoil order D.

The common subgroup Y is illustrated in FIG. 3 and contains an OR gate 90 which receives the signals $(\bar{a}b)_1 \ldots (\bar{a}b)_9$, an OR gate 91 which receives the signals $(a\bar{b})_1 \ldots (a\bar{b})_9$, a modulo 3 counter 92, which receives the signal Z, and a modulo 2 counter 93, which also receives the signal Z. The modulo 3 counter 92 may receive a counting order W as the output signal of the OR gate 90 and the modulo 2 counter 93 may receive a counting order F as the output signal of the OR gate 91. The counting order W means "hole too many"; while, the counting order or command F designates "hole lacking".

An AND gate 94 having three inputs receives from the output terminal $\bar{Q}$ of the counter 92 a signal Wa, from the output terminal $\bar{Q}$ of the counter 93 a signal Fa, as well as the signal Z. It furnishes at the output thereof the character call signal A which is applied to the communication unit U (FIG. 1).

The output terminal Q of the counter 92 and the output terminal Q of the counter 93 are connected to the inputs of an OR gate 95 whose output signal excites a bistable flip-flop 97 by way of the terminal S1. The output Q of this bistable flip-flop 97 furnishes a recoil order D to the buffer memory 73 (FIG. 1). The output $\bar{Q}$ furnishes the signal $S = \bar{D}$. The flip-flop 97 is reset to zero by the output signal B of an OR gate 96 which receives the signals *b*1 . . . *b*9. The signal B has the designation "reading of all the tracks." A bistable flip-flop 99, enabled on the terminal S2 by the signal B, is reset to zero by the signal Z and furnishes the sampling signal K, which is applied to the different subgroups Y1 . . . Y9.

The signals W (hole too many) and F (hole lacking) are applied to the inputs of an OR gate 98 whose output signal E designating a perforation error is applied to the communication unit U.

Extracted from the terminal Q of the modulo 3 counter 92 is a signal G which is applied to all the subgroups $Y_1$ . . . Y9 (FIG. 2).

Figure 4:
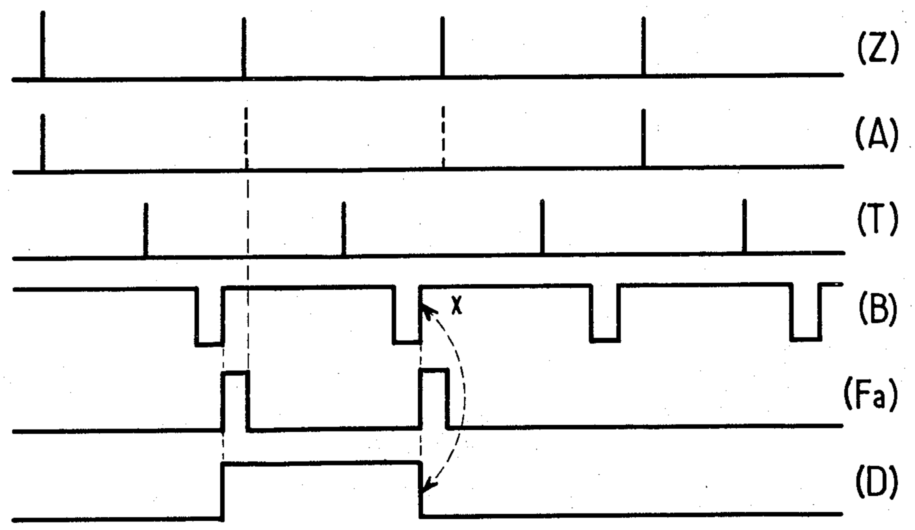
FIG. 4 is a waveform diagram illustrating the form of the signals at various points in the system of FIG. 1 to facilitate the understanding of the operation of the correction in the case of a first type of error.

FIG. 4 represents a group of six waveforms representing the succession of certain signals in the case in which a hole or aperture is lacking. The first waveform shows the perforation signal Z. The second waveform shows the character call signal A. The third waveform shows the tape advance signal T. The fourth waveform shows the signal B designating the reading of all the tracks. The form of the signal B is shown in an idealized manner since the real signal has a more rounded configuration. The fifth waveform is an illustration of the signal $F_a$ designating the hole or aperture lacking condition. The sixth waveform is an illustration of the recoil signal D.

A signal Z is emitted at each turn of the shaft 62. If there is no perforation error, there corresponds to each signal Z a character call signal A, an each signal T for the advancing order causes the tape to advance by one step.

If there is an error in the perforation due to lack of a hole or aperture, the counter 93 receiving an order F to count will begin to count, and its terminal $\overline{Q}$ which was at level 1 will pass to zero. The result thereof is the suppression of the signal A during two turns of the cam. The flip-flop 97 enabled by the output signal of gate 95 is reset to zero by the first rising front x of the signal B which follows the bginning of the counting operation. What follows is that the tape has been reset backwards by one step due to generation of the recoil signal D. The tape having recoiled by one step in the absence of a character call, the tape is still at the same character position which was perforated incorrectly the first time.

Figure 5:
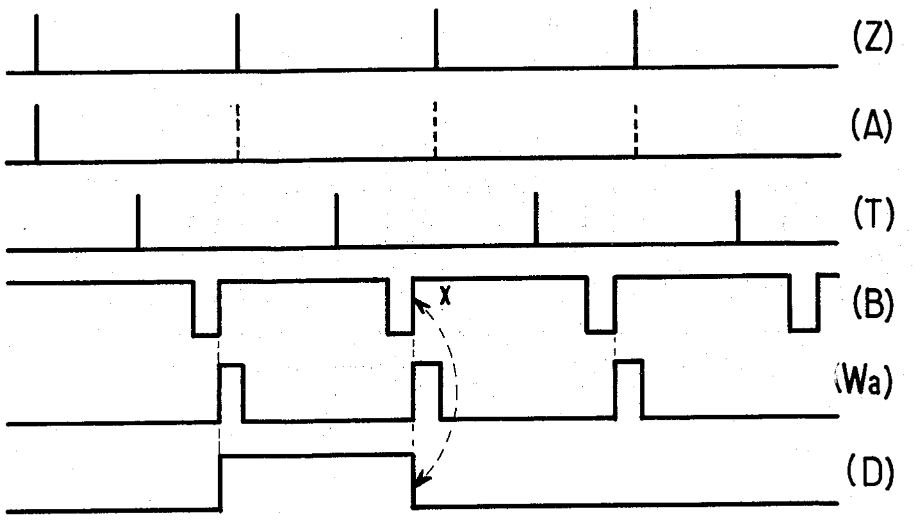
FIG. 5 is a waveform diagram of a second group of signals corresponding to the case of a second type of error.

FIG. 5 provides waveforms which correspond to those of FIG. 4, however, the waveforms in this case relate to the situation where there is one hole or aperture too many. The graphic illustrations Z, A, T, B, and D are the same as in FIG. 4; however, waveform $W_a$ has replaced the waveform $F_a$.

As described previously, the recoil order signal D causes the recoiling of the tape by one step. But this time there are three suppressed signals A instead of two suppressed signals A. In the first place, the tape recoils by one step. In the second place, all of the holes or apertures are perforated, in response to generation of the signal G. In the third place, the correct code is perforated once again.

In both of these exemplary cases, i.e., with a hole or aperture missing, or a hole or aperture in excess, if the new perforated code is still not correct, it is assumed that the perforator has deteriorated, for example because of a broken punch. In this case, the perforation error signal E, when applied to the communication unit U, causes the stopping of the installation.

The present invention has been described herein for the case of a perforator-reader, but its scope is sufficiently broad to accommodate other devices of a similar type, such as a printer-reader. Thus, the same automatic correction logic provided by this invention may be applied to any recording-reading element, for example a magnetic recorder. Thus, in this application the term "marking" will refer not only to perforating and printing, but also to magnetizing and other operations for storing data on a tape.

It is readily apparent that the present invention assures with simple means the correction of an erroneously formed code with a high degree of reliability and with as small a loss of time as possible.

The present invention is applicable without any modification to an analogous apparatus operating according to any other recording method, for example magnetic recording.

What is claimed is:

1. In combination with a coder-reader apparatus operating in conjunction with a tape capable of carrying coded information while advancing step-by-step through said apparatus, said coder-reader apparatus including coding means for marking said tape with coded information at successive locations and reading means for reading said coded information simultaneously with said marking at an adjacent location as said tape moves in a step-by-step fashion, and communication means for supplying coded information to said coding means, a device for automatically correcting a recorded code erroneously marked on said tape comprising first logic means for detecting data erroneously marked on said tape and said logic means responsive to said first logic means for causing said tape to recoil by one step to enable correction of said data, said second logic means including first delay means for inhibiting said communication means for two steps while said tape is recoiled during one step and is caused to come to a standstill for the duration of one step to permit operation of said coding means once again in case of incomplete data recording, said second logic means including second delay means for inhibiting said communication means for three steps while said tape is recoiled during one step, is caused to come to a standstill for the duration of one step to permit canceling the data at that location, and advance of the tape again for recording of the same data correctly in case of extraneous data recording.

2. In combination with a coder-reader apparatus operating in conjunction with a tape capable of carrying coded information while advancing step-by-step through said apparatus, said coder-reader apparatus including coding means for marking said tape with coded information at successive locations and reading means for reading said coded information simultaneously with said marking at an adjacent location as said tape moves in a step-by-step fashion, and communication means for supplying coded information to said coding means, a device for automatically correcting a recorded code erroneously marked on said tape comprising first logic means for detecting data erroneously marked on said tape and said logic means responsive to said first logic means for causing said tape to recoil by one step to enable correction of said data, wherein said coder-reader includes a plurality of marking members arranged to produce a coded indicia at each location on said tape in response to selective actuation thereof, said first logic means including a plurality of logic subgroups, each logic subgroup being connected to said coder-reader to receive a reading signal corresponding to the indicia produced by a respective marking member and to said communication means to receive a marking signal indicating the desired indicia to be produced by said respective marking member and including comparison means for each potential data location to indicate by a first signal the absence of an indicia when one is required and by a second signal the presence of an indicia when none is desired, wherein each logic subgroup includes a first logic inverter having the reading signal from said coder-reader connected to the input thereof and a second logic inverter having the marking signal from said communication means connected to the input thereof, a first AND gate receiving the reading signal and the output of said second logic inverter at inputs thereof to produce said second signal and a second AND gate receiving the marking signal and the output of said first logic inverter at inputs thereof to produce said first signal.

3. In combination with a coder-reader apparatus operating in conjunction with a tape capable of carrying coded information while advancing step-by-step through said apparatus, said coder-reader apparatus including coding means for marking said tape with coded information at successive locations and reading means for reading said coded information simultaneously with said marking at an adjacent location as said tape moves in a step-by-step fashion, and communication means for supplying coded information to said coding means, a device for automatically correcting a recorded code erroneously marked on said tape comprising first logic means for detecting data erroneously marked on said tape and said logic means responsive to said first logic means for causing said tape to recoil by one step to enable correction of said data, wherein said coder-reader includes a plurality of marking members arranged to produce a coded indicia at each location on said tape in response to selective actuation thereof, said first logic means including a plurality of logic subgroups, each logic subgroup being connected to said coder-reader to receive a reading signal corresponding to the indicia produced by a respective marking member and to said communication means to receive a marking signal indicating the desired indicia to be produced by said respective marking member and including comparison means for each potential data location to indicate by a first signal the absence of an indicia when one is required and by a second signal the presence of an indicia when none is desired, wherein said second logic means includes a first OR gate receiving all of said first signals from said logic subgroups, a second OR gate receiving all of said second signals from said logic subgroups, a modulo 3 counter enabled by the output of said second OR gate and connected to said coder-reader to count the step periods of said tape, a modulo 2 counter enabled by the output of said first OR gate and connected to said coder-reader to count the step periods of said tape, a first flip-flop connected to said modulo 2 counter and said modulo 3 counter and producing a recoil signal at one output thereof and a mark authorization signal at the other output thereof, and a second flip-flop enabled by said reading signals to provide an enabling signal to each of said logic subgroups.

4. The combination according to claim 3 wherein each logic subgroup includes a first logic inverter having the reading signal from said coder-reader connected to the input thereof and a second logic inverter having the marking signal from said communication means connected to the input thereof, a first AND gate receiving the reading signal and the output of said second logic inverter at inputs thereof to produce said second signal and a second AND gate receiving the marking signal and the output of said first logic inverter at inputs thereof to produce said first signal.

5. The combination according to claim 4 wherein said second logic means further includes a third AND gate connected to said modulo 2 counter and said modulo 3 counter to provide a character call signal to said communication means when no error has been detected by said first logic means.

6. The combination defined in claim 5 wherein said second logic means further includes a third OR gate connected to the outputs of said first and second OR gates to apply an error signal to said communication means.

* * * * *